Jan. 30, 1945. S. GILBERT 2,368,537
POWER PLANT ACCESSORY
Filed Feb. 8, 1943 2 Sheets-Sheet 1

INVENTOR
BY Samuel Gilbert.
Martin J. Finnegan ATTORNEY

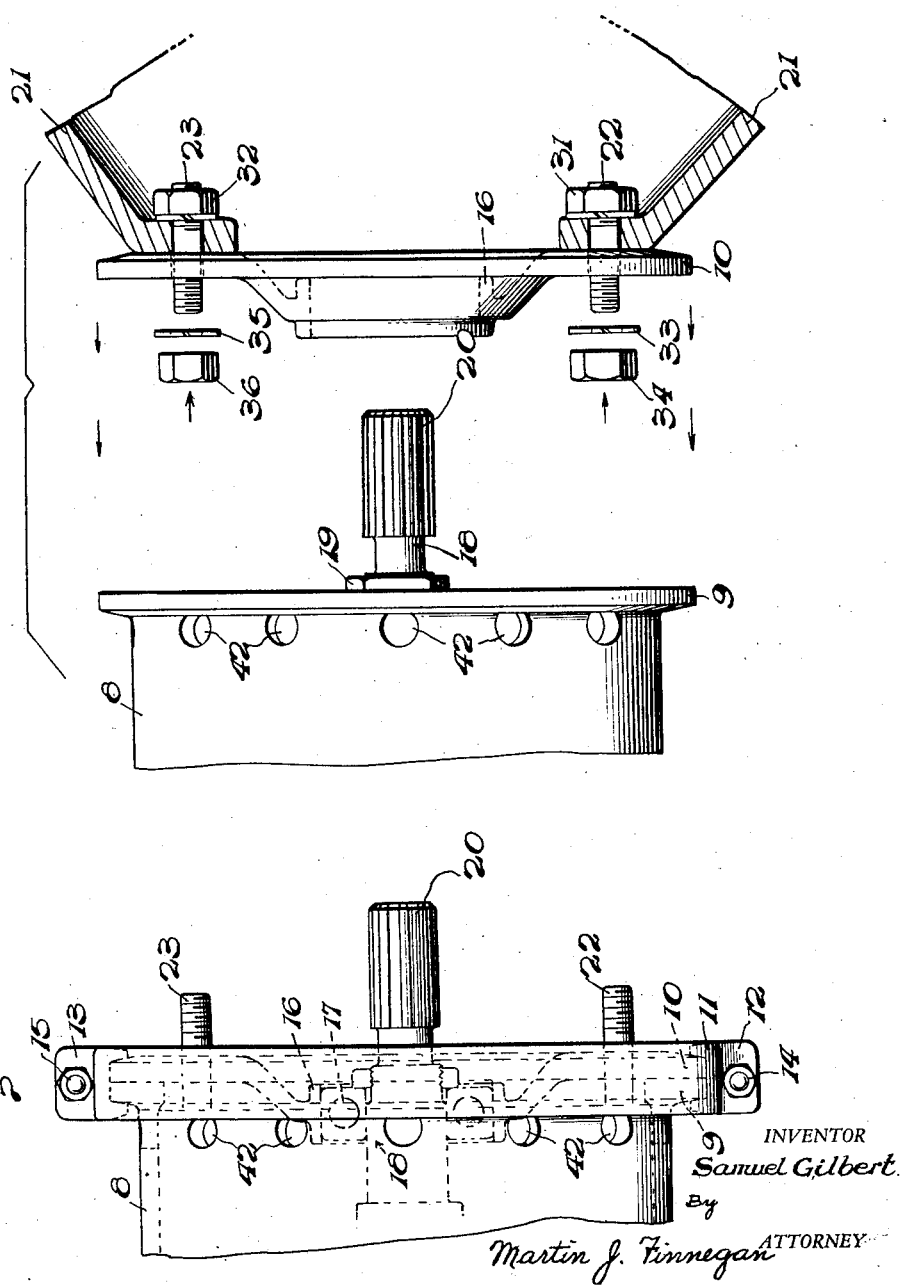

Patented Jan. 30, 1945

2,368,537

UNITED STATES PATENT OFFICE 2,368,537

POWER PLANT ACCESSORY

Samuel Gilbert, Verona, N. J., assignor to Bendix Aviation Corporation, Bendix, N. J., a corporation of Delaware Application February 8, 1943, Serial No. 475,139

6 Claims. (Cl. 248—2)

This invention relates to power plant accessories, and particularly to the mounting of power plant accessories.

Power plants of the internal combustion type, such as used for aircraft propulsion, usually include an engine crank-case having one or more circular openings at the outer surfaces of frustoconical bosses commonly termed "mounting flanges." On such mounting flanges it is customary to provide a series of angularly spaced holes to receive bolts or screws by which the engine accessory units (starters, generators, pumps, etc.) are attached; the drive to or from the unit being by a shaft passing through the central opening in such mounting flange. These bolt holes have their centers on a circle concentric with the central opening; but as the diameter of the bolt circle is often considerably less than the diameter of the accessory to be mounted, a mounting problem is created. Heretofore this mounting problem has been met (but not with entire satisfaction) by providing a neck portion on the accessory and flanging the neck portion to provide a bolt receiving section of smaller diameter than the main portion of the accessory. This expedient in turn provides problems of its own, one of which is the difficulty encountered by mechanics who must install the units, as the space around the neck portion of the accessory is too small, in axial extent, to permit easy attachment of bolts or screws.

Objects of the present invention are to provide new means for mounting such accessories.

These and other objects of the invention will become apparent from inspection of the following specification when read with reference to the accompanying drawings wherein is illustrated the preferred embodiment of the invention. It is to be expressly understood, however, that the drawings are for the purpose of illustration only, and are not designed as a definition of the limits of the invention, reference being had to the appended claims for this purpose.

In the drawings:

Fig. 2 is a partial view in elevation; and

Fig. 3 is an exploded view of parts.

Figure 1:
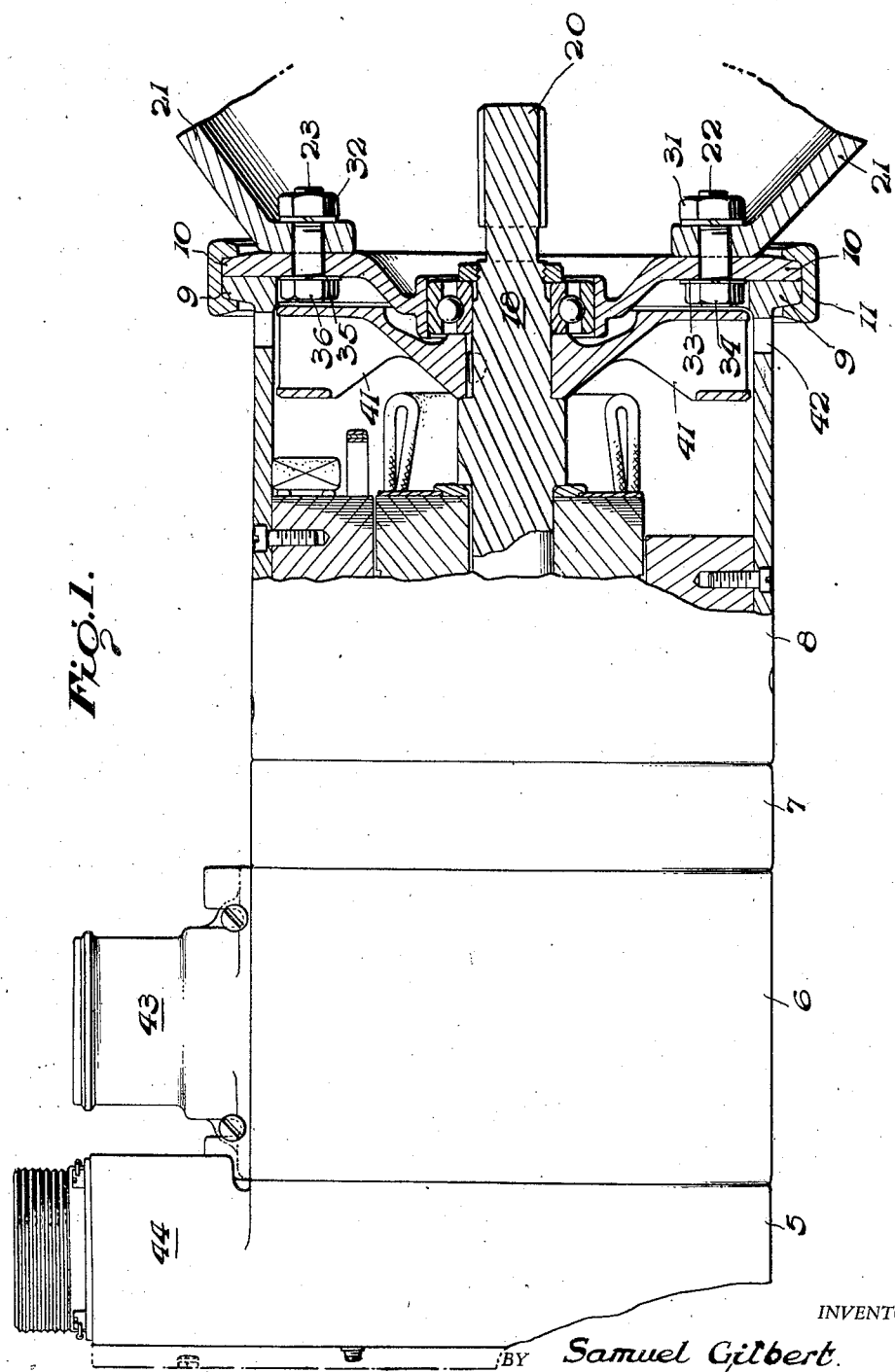
Fig. 1 is an elevation view, partially in section of a device embodying the invention.

Reference numerals 5, 6, 7 and 8 designate successive sections of an accessory housing, the section 8 being flanged, as at 9, and clamped to an end closure member 10, as by split clamps 11 having lugs 12 (Fig. 2) to receive fastening members 13 and 14. However, instead of assembling all sections, including the closure section 10, in advance of attachment to the engine crank-case section 21 (as has formerly been the practice) my invention involves the concept of reversing this former procedure. By reversal of the former procedure I mean that I propose to first attach the closure member 10 to the crank-case section 21 (or equivalent mounting support) and fasten the same in place (as by means 22, 23, 31, 32, 33, 34, 35 and 36, as shown in Fig. 3) after which the remainder of the accessory is moved up into registry with the thus-installed member 10. The final operation is to apply and secure the clamps 11 to the now abutting flanges 9 and 10.

It will be understood that as the flange 9 of the main assembly is moved into abutment with closure member 10, the shaft assembly (20, 18, 17, 19, 41, etc.) will automatically align itself, as the bearing assembly 17 is designed to register properly with circular rim 16 of the closure member 10, and the splined end 20 of the shaft is designed to project therethrough, to the proper extent to mesh with the engine drive unit (not shown).

What is claimed is:

1. In an engine accessory, the combination of a flanged end portion of said engine accessory, an end closure member and a flange-enveloping member, means for securing said end closure member to a mounting support on the engine, and means for securing said enveloping member so as to fasten said flanged end portion to said end closure member, said last-named means being constructed to be detachable to then permit removal of the enveloping member and of said flanged end portion without disturbing the mounted status of said end closure member, while permitting removal of said engine accessory.

2. In an engine accessory, the combination of a housing having a flanged portion at one end thereof, a closure member for said end and having a flanged portion matching that of said housing, means for securing said member to a mounting support on the engine, a channeled member constructed to removably fit over both said flanged portions, and a means operable to one position in coaction with said channeled member when the latter is fitted over said flanged portions to clamp said portions together and to an unclamping position permitting removal of said member from at least one of said flanged portions whereupon the removal of said housing may be then effected without disturbing the mounted status of said end closure.

3. The combination set forth in claim 2 in which the portion of at least one of said flanged portions which coacts with said channeled member is substantially frusto-conical with the base toward the mating flange, whereby the wedging action of the clamping member forces the flanges together without play.

4. In an engine accessory having a shaft for engaging a movable part of the engine through an opening therein, the combination of a closure member for said opening constructed to be attachable to the engine and having a flange portion concentric with the shaft, an accessory housing having a matching flange portion also concentric with the shaft, a channeled member normally fitting around both said flange portions and detachable from at least one of them, said channeled member and said flange portions being shaped to maintain both an abutting and an alignment of said flange portions when said channeled member is thus fitted and placed under tension, and means coacting with said channeled member and operable to normally place the latter under tension to mount the accessory with the shaft and the movable part in operative engagement and to relieve the tension to permit the removal of the portion of the engine accessory containing the shaft without disturbing the closure member.

5. In an engine accessory having a shaft for engaging a movable part of the engine through an opening therein, the combination of a closure member for said opening constructed to be attachable to the engine and having a flange portion concentric with the shaft, an accessory housing having a matching flange portion also concentric with the shaft, a tension member normally fitting around both said flange portions and detachable from at least one of them, said tension member and said flange portions being shaped to maintain both an abutting and an alignment of said flange portions when said tension member is thus fitted and placed under tension, and means coacting with said tension member and operable to place the latter under tension for firmly mounting the accessory with the shaft and the movable part in engagement and to relieve the tension for permitting the removal of the portion of the engine accessory containing the shaft without disturbing the closure member.

6. In an engine accessory, the combination of an accessory housing having a flanged portion, a closure member for said housing having a flange portion matching that of the housing and constructed to be attachable to the engine, a tension member normally fitting around both said flange portions and detachable from at least one of them, said tension member and said flange portions being shaped to maintain an alignment by circumferential binding and an abutting by wedge-action of the tension member with said flange portions when the tension member is thus fitted and placed under tension, and means coacting with said tension member and operable to place the latter under tension for firmly mounting the accessory on the engine and to relieve the tension for permitting the removal of the accessory housing without disturbing the closure member.

SAMUEL GILBERT.